United States Patent
Ali et al.

(10) Patent No.: US 7,457,248 B1
(45) Date of Patent: Nov. 25, 2008

(54) GRACEFUL SHUTDOWN OF NETWORK RESOURCES IN DATA NETWORKS

(75) Inventors: Zafar Ali, Ann Arbor, MI (US); Anca Zamfir, Kanata (CA); David D. Ward, Somerset, WI (US); Stefano B. Previdi, Wavre (BE); Jean-Philippe Vasseur, Dunstable, MA (US); Peter Psenak, Waterloo (BE)

(73) Assignee: Cisco Technology, Inc., San Jose, CA (US)

( * ) Notice: Subject to any disclaimer, the term of this patent is extended or adjusted under 35 U.S.C. 154(b) by 1019 days.

(21) Appl. No.: 10/775,855

(22) Filed: Feb. 10, 2004

(51) Int. Cl.
 *G01R 31/08* (2006.01)
(52) U.S. Cl. .................. 370/235; 370/236; 370/390; 370/392
(58) Field of Classification Search ................. None
See application file for complete search history.

(56) References Cited

U.S. PATENT DOCUMENTS

| | | | | |
|---|---|---|---|---|
| 5,608,720 | A * | 3/1997 | Biegel et al. | 370/249 |
| H1964 | H * | 6/2001 | Hoffpauir et al. | 370/419 |
| 6,526,056 | B1 | 2/2003 | Rekhter et al. | |
| 6,553,423 | B1 | 4/2003 | Chen | |
| 6,836,805 | B1 * | 12/2004 | Cook | 709/245 |
| 6,938,084 | B2 * | 8/2005 | Gamache et al. | 709/226 |
| 7,035,911 | B2 * | 4/2006 | Lowery et al. | 709/217 |
| 7,054,304 | B2 * | 5/2006 | Wang | 370/352 |
| 7,366,782 | B2 * | 4/2008 | Chong et al. | 709/227 |
| 2002/0161889 | A1 * | 10/2002 | Gamache et al. | 709/226 |
| 2002/0172199 | A1 * | 11/2002 | Scott et al. | 370/389 |
| 2003/0033412 | A1 * | 2/2003 | Sundaresan et al. | 709/227 |
| 2004/0017778 | A1 * | 1/2004 | Bansal et al. | 370/242 |
| 2005/0163061 | A1 * | 7/2005 | Piercey et al. | 370/255 |
| 2006/0155833 | A1 * | 7/2006 | Matsuda et al. | 709/220 |
| 2006/0291388 | A1 * | 12/2006 | Amdahl et al. | 370/230 |

OTHER PUBLICATIONS

R. Perlman, Interconnections, Addison Wesley Longman, Inc., Reading, Massachusetts, Nov. 1996, pp. 256-325.

A. Retana, et al., Request for Comments (RFC) 3137, "OSPF Stub Router Advertisement, " Internet Engineering Task Force (IETF), http://www.ietf.org, Jun. 2001, pp. 1-5.

D. Katz, et al., RFC 3630, "Traffic Engineering (TE) Extensions to OSPF Version 2, " Internet Engineering Task Force (IETF), http://www.ietf.org, Sep. 2003, pp. 1-14.

(Continued)

*Primary Examiner*—Phirin Sam
(74) *Attorney, Agent, or Firm*—Cesari and McKenna LLP

(57) ABSTRACT

A technique gracefully shuts down network resources, such as nodes, interfaces and protocols, in a data network in a manner that minimizes network disruption. The technique may be used with both connectionless and connection-oriented networking systems. A node gracefully shuts down a network resource associated with the node by i) notifying other nodes in the network that the resource is being gracefully shutdown, ii) waiting for a condition to occur, and iii) when the condition occurs, shutting down the resource. The condition may include the expiration of a predetermined amount of time and/or monitoring the resource to determine if the resource has reached a certain level of activity. In response to receiving a notification that a resource is being gracefully shutdown, a node takes action to reroute traffic around the resource. If no alternative route is available, the node may continue to route traffic to the resource until it is shut down.

42 Claims, 11 Drawing Sheets

OTHER PUBLICATIONS

R. Braden, et al., RFC 2205, "Resource Reservation Protocol (RSVP)-Version 1, Funcational Specification," Internet Engineering Task Force (IETF), http://www.ietf.org, Sep. 1997, pp. 1-112.

K. Kompella, et al., RFC 3477, "Signalling Unnumbered Links in Resource ReSerVation Protocol-Traffic Engineering (RSVP-TE)," Internet Engineering Task Force (IETF), http://www.ietf.org, Jan. 2003, pp. 1-9.

D. Awduche, et al., RFC 3209, "RSVP-TE: Extensions to RSVP for LSP Tunnels," Internet Engineering Task Force (IETF), http://www.ietf.org, Dec. 2001, pp. 1-61.

K. Kompella, et al., "Link Building n MPLS Traffic Engineering," draft-ietf-mpls-bundle-04.txt, Internet Engineering Task Force (IETF), http://www.ietf.org, Jan. 2003, pp. 1-8.

K. Kompella, et al., "IS-IS Extensions in Support of Generalized MPLS," draft-ietf-isis-gmpls-extensions-16.txt, Internet Engineering Task Force (IETF), http://www.ietf.org, Dec. 2002, pp. 1-12.

O. Sharon, "Dissemination of Routing Information in Broadcast Networks: OSPF versus IS-IS, "Institute of Electrical and Electronics Engineers (IEEE) Network, IEEE Network, Jan./Feb. 2001, http://www.ieee.org, pp. 56-65.

* cited by examiner

1200

| AGE 1210 | OPTIONS 1220 | TYPE 1230 |
|---|---|---|
| LINK STATE 1240 ||| 
| ADVERTISING ROUTER 1250 |||
| SEQUENCE NUMBER 1260 |||
| CHECKSUM 1270 | LENGTH 1280 ||

FIG. 12

GRACEFUL SHUTDOWN OF NETWORK RESOURCES IN DATA NETWORKS

BACKGROUND OF THE INVENTION

1. Field of the Invention

The present invention relates to computer networks and specifically to gracefully shutting down resources in a computer network.

2. Background Information

A computer network is a geographically distributed collection of nodes interconnected by communication links and segments for transporting data between end stations, such as computers. Many types of network segments are available, with the types ranging from local area networks (LANs) to wide area networks (WANs). LANs typically connect personal computers and workstations over dedicated, private communications links located in the same general physical location, such as a building or a campus. WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Certain nodes in the network, such as routers, are often configured to "route" data, such as packets, between various nodes in the network. Routing is typically performed at the network layer or layer-3 (L3) of the Open Systems Interconnect (OSI) Reference Model. Routers often maintain routing databases, which are typically configured to hold routing information including L3 addresses and interface information that the router uses to determine where data (e.g., data packets) are to be forwarded in order to reach their destination. For example, a router may have a routing database containing one or more entries wherein each entry contains a L3 destination address of a destination node and interface information of an interface on the router through which the destination node may be reached. A data packet containing a destination address that matches a destination address of an entry in the routing table is forwarded by the router to the interface specified by the entry for transfer to the destination node.

A router typically executes one or more routing protocols that enable the router to route packets and exchange routing information with other routers in the network. The routers often use this information to configure (e.g., compute) their routing databases. The routing protocols may include distance vector protocols, such as Routing Information Protocol (RIP) or link-state protocols, such as the Intermediate-System-to-Intermediate-System (IS-IS) protocol or the Open Shortest Path First (OSPF) protocol. Routing information is typically exchanged between the routers in the form of advertisement messages. For example, nodes executing the IS-IS protocol exchange information using an advertisement message called a Link State Packet (LSP). Likewise, nodes executing the OSPF protocol exchange routing information using an advertisement message called a Link State Advertisement (LSA). As used herein, an advertisement message refers generically to a message that a routing protocol uses to convey routing information to other intermediate nodes (e.g., a router, a switch) in the network. An intermediate node that acquires an advertisement message may use information contained therein to update its routing database.

Some routing protocols transfer data packets through the network between a source and destination in a connectionless manner. Here, packets travel from the source to the destination "hop-by-hop" via routers in the network on a path determined by the destination address contained in the packet and routing information contained in each router's routing database. Unlike connection-oriented protocols (discussed below), the data packets do not travel on a predefined path (connection) between the source and destination. Rather, the packets may travel on various paths from the source and destination depending on the state of the routing database at each router. An example of a connectionless protocol is the Internet Protocol (IP).

A "connection-oriented" protocol transfers data packets through the network over a predefined path often called a connection or circuit that is established between the source and destination. Here, the connection or circuit is established between the source and destination before any data is transferred. After the connection has been established, data are transferred between the source and destination over the path defined by the connection. When the connection is no longer needed, the connection is typically "torn down" and resources, such as nodes, interfaces, protocols and so on, utilized by the connection are made available for other connections. An example of a connection-oriented protocol is the Multiprotocol Label Switching (MPLS) protocol. A resource, as used herein, refers to entities associated with an intermediate node. These entities may include the intermediate node itself, an interface (e.g., a port) on the intermediate node and a protocol running on the intermediate node.

Some connection-oriented protocols utilize unidirectional connections, which are connections that transfer data in one direction from a source to a destination. For example, a unidirectional connection between a router A and a router B transfers data in one direction from router A to router B. In order to transfer data in the other direction, i.e., from router B to router A, another unidirectional connection from router B to router A would have to be established. The connections may be "signaled" end-to-end using a signaling protocol, such as the Resource Reservation Protocol (RSVP). The end of the connection that initiates the signaling for the connection is often called the "head-end" of the connection and the end of the connection that terminates the signaling is often called the "tail-end" of the connection. The router hosting the "head-end" of the connection is often called the head-end node and the router hosting the "tail-end" of the connection is often called the tail-end node. Thus, for example, in a connection from a source to a destination where router A hosts the "head-end" of the connection and router B hosts the "tail-end" of the connection, router A is the head-end node and router B is the tail-end node.

Some routing protocols provide mechanisms that a router may use to inform other routers in the network of a condition that warrants "removing" a resource associated with the router from service. One reason for providing these mechanisms is to ensure the other routers do not rely on forwarding paths associated with the resource. For example, the IS-IS protocol defines an "overload bit" mechanism that may be inserted into an advertisement message issued by a router to notify other routers in the network that it is unable to process packets for links identified in the message. Other routers in the network acquiring the message may respond by reconfiguring (e.g., re-computing) their routing databases to remove the router from their databases, thus avoiding routing packets to that router.

Another mechanism that may be employed to "remove" resources from a data network is a "max metric" mechanism. Here, a resource is "removed" by advertising routes associated with the resource as having a "maximum path cost" thereby making the routes appear as if their path cost is "infinite" and discouraging their use. For example, a router advertising all routes associated with a particular interface as having an "infinite" path cost may cause other routers acquiring these advertisements to respond by reconfiguring their routing databases to not route packets through the interface.

One problem with the above-described mechanisms is that they do not address the issue of graceful shutdown of a network resource. Graceful shutdown of a network resource involves shutting down a resource such as, an interface, protocol, or a node, in a manner that minimizes disruption of traffic carried in the network. The above-described mechanisms do not remove resources in a "graceful" manner. Rather, these mechanisms may cause nodes in the network to respond in a manner that may lead to the disruption of traffic in the network. For example, a router issuing an advertisement message with the overload bit set may immediately cease forwarding all data sent to the router after the message has been issued. Consequently, "in transit" data that reaches the router after the message has been sent may be lost.

A problem associated with the above-described max metric mechanism is that even though the path cost for a particular route is set to "maximum," the route may still be used if there is no alternative lower cost route available. Thus traffic may be carried by a network resource advertised as having a maximum path cost even though the purpose of advertising a high cost was to cause traffic to be rerouted around the resource.

In addition, the above-described mechanisms do not "cleanly" address connection-oriented protocols. For example, if an interface is immediately "shut down" connections carried by the interface may be immediately dropped and transit data carried on those connections may be lost, thus, leading to network disruptions. Further, in order to continue transferring data from a source to a destination associated with the dropped connections, new connections that do not use the interface would have to be established. The above-described mechanisms do not address this issue.

SUMMARY OF THE INVENTION

The present invention relates to a technique for gracefully shutting down resources on an intermediate node in a manner that minimizes network disruption and overcomes the shortcomings associated with prior art techniques. The inventive technique may be used with in both connectionless and connection-oriented networking environments.

According to an aspect of the inventive technique, a node gracefully shuts down a resource associated with the node by i) advertising to other nodes in the network that the resource is being gracefully shutdown, ii) waiting for a condition that warrants shutting down the resource to occur, and iii) when the condition occurs, shutting down the resource. The condition may include waiting for a predetermined amount of time and/or monitoring the resource to determine if the resource has reached a certain predetermined level of activity. In response to receiving a notification that a resource is being gracefully shutdown, the node takes action to reroute traffic around the resource, such as regenerating its routing database to not include the resource. If no alternative route is available, the node may continue to route traffic to the resource until it is shut down.

In another aspect of the inventive technique, a node gracefully shuts down a network resource associated with a connection between a head-end node and a tail-end node by i) notifying the head-end node that the resource is being gracefully shutdown, ii) waiting for a condition to occur, and iii) when the condition occurs, shutting down the resource. The head-end node responds to the notification by establishing an alternative connection to the tail-end node that does not utilize the resource. The head-end node then "tears down" the original connection. The condition may include waiting a predetermined amount of time to allow the head-end node to establish the alternative connection, monitoring the utilization of the resource to determine if the resource has reached a pre-determined level of utilization, and/or waiting for the head-end node to signal that the original connection is being torn down.

Advantageously, the inventive technique is an improvement over prior techniques in that it enables network resources in a data network to be gracefully shut down, without causing undue network disruptions.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 12 is a schematic block diagram of an exemplary link state advertisement header that may be advantageously used with the present invention.

DETAILED DESCRIPTION OF AN ILLUSTRATIVE EMBODIMENT

Figure 1:
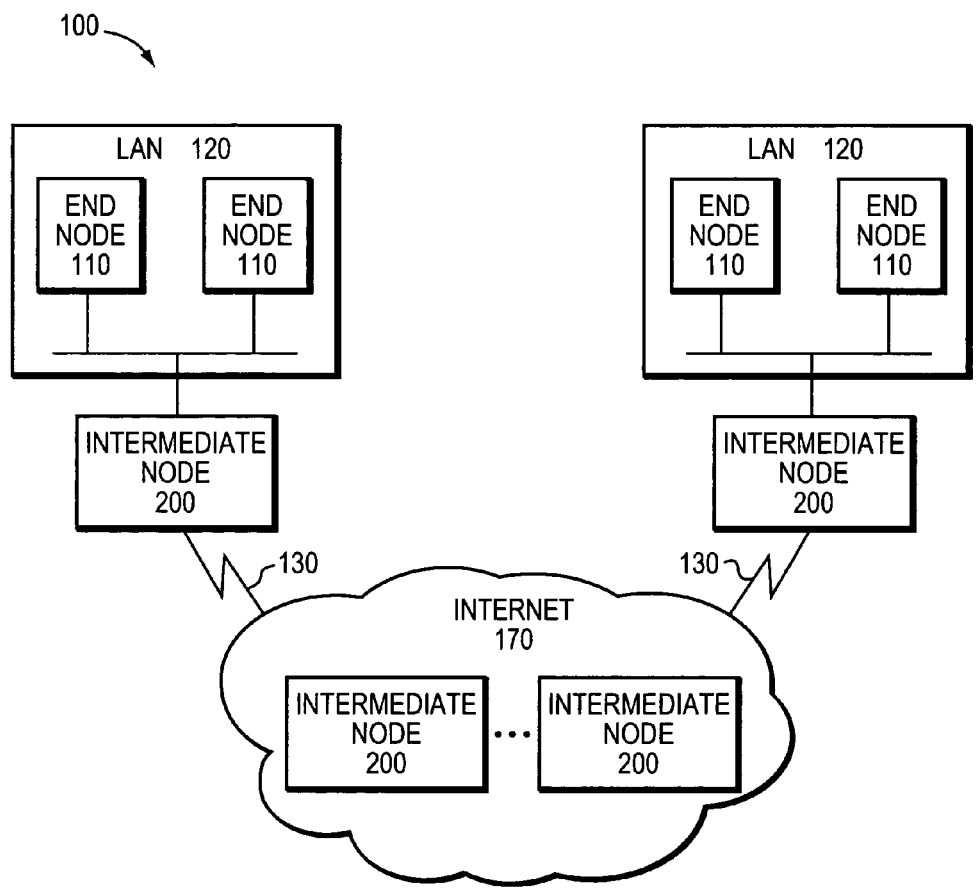
FIG. 1 is a schematic block diagram of an exemplary data network that may be advantageously used with the present invention.

FIG. 1 is a schematic block diagram of a data network 100 that may be advantageously used with the present invention. The data network 100 comprises a collection of communication (data) links and segments connected to a plurality of network entities, such as end nodes 110 and intermediate nodes 200. The communication links and segments may comprise local area networks (LANs) 120, wide area networks (WANs), such as Internet 170, and WAN links 130 interconnected by intermediate nodes 200 to form an internetwork of computer nodes. These internetworked nodes communicate by exchanging data packets according to a predefined set of protocols, such as the Transmission Control Protocol/Internet Protocol (TCP/IP) and the Internetwork Packet eXchange (IPX) protocol. A protocol, as used herein, is a set of formal rules describing how to transfer data between two entities in a data network.

Figure 2:
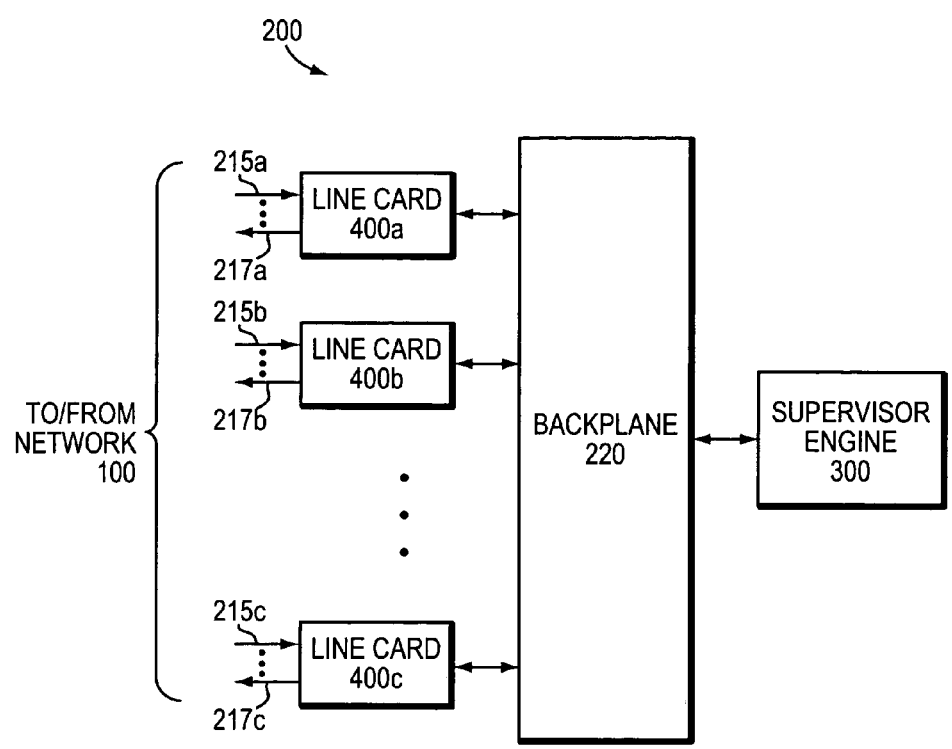
FIG. 2 is a high-level partial schematic block diagram of an intermediate node that may be advantageously used with the present invention.

FIG. 2 is a high-level partial schematic block diagram of intermediate node 200, which is illustratively a router, that may be advantageously used with the present invention. Suitable intermediate nodes that may be used with the present invention include the Cisco 7200, 7600 and 12000 Series routers available from Cisco Systems Incorporated, San Jose, Calif. Intermediate node 200 comprises one or more line cards 400 and a supervisor engine card 300 interconnected by a backplane 220. Node 200 is configured to perform, inter alia, various conventional layer-2 (L2) and layer-3 (L3) switching and routing functions including forwarding and processing data packets in accordance with the inventive technique. As used herein, L2 and L3 refer to the data link layer and network layer, respectively, of the Open Systems Interconnection (OSI) reference model. Node 200 is also configured to provide support for various combinations of protocols including, e.g., Open Shortest Path First (OSPF), Intermediate-System-to-Intermediate-System (IS-IS), Multi-protocol Label Switching (MPLS), TCP/IP, Ethernet, Asynchronous Transfer Mode (ATM), and Frame Relay (FR).

The backplane 220 comprises a point-to-point interconnect bus that interconnects the various cards and allows data and signals to be transferred from one card to another. The line cards 400 connect (interface) the intermediate node 200 with the network 100. The line cards 400 transfer and acquire data packets to and from the network via output ports 217 and input ports 215, respectively, using various protocols such as, ATM and Ethernet. Functionally, the line cards 400 acquire data packets from the network 100 via the input ports 215 and forward the data packets to the data bus 220, as well as transmit data packets received from the data bus 220 to the network 100 via the output ports 217. The ports 215, 217 may comprise, e.g., ATM, Ethernet, Fast Ethernet (FE), Gigabit Ethernet (GE), and FR ports.

Figure 3:
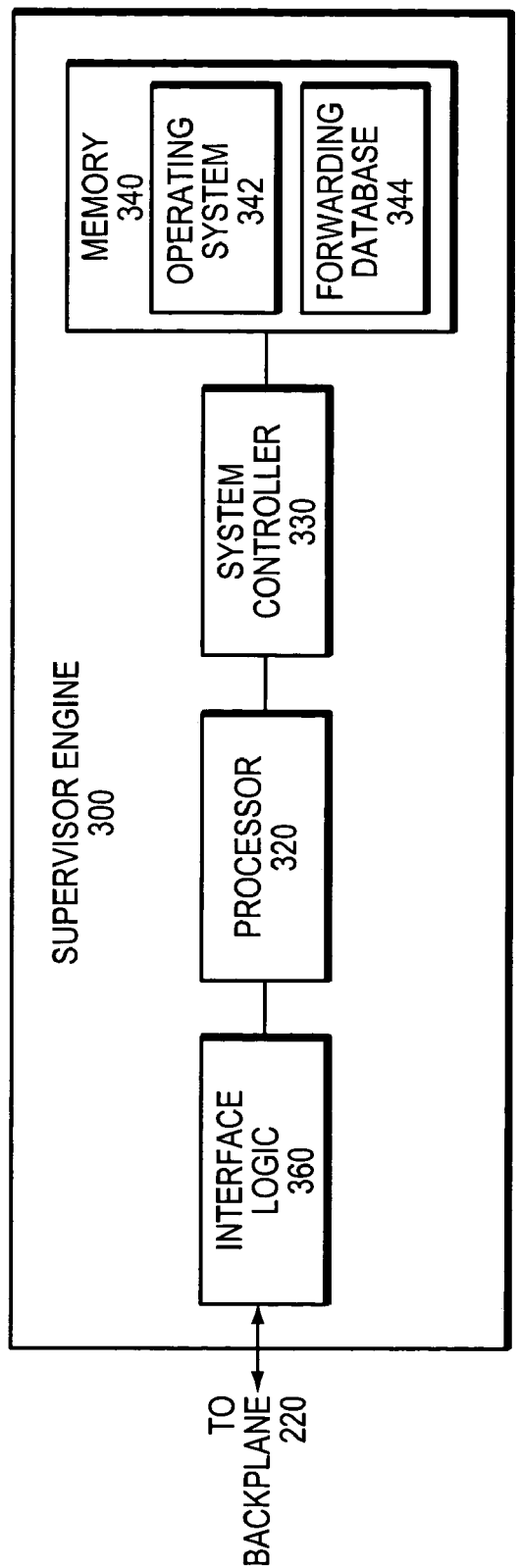
FIG. 3 is a high-level partial schematic block diagram of a supervisor engine that may be advantageously used with the present invention.

The supervisor engine 300 comprises logic that is, inter alia, configured to manage node 200, maintain a centralized forwarding database that it distributes to the line cards 400, execute various protocols, such as OSPF, IS-IS, and MPLS, and perform other various functions including functions that incorporate aspects of the inventive technique. FIG. 3 is a high-level partial schematic block diagram of a supervisor engine that may be advantageously used with the present invention. Supervisor engine 300 comprises a processor 320, system controller 330, interface logic 360, and memory 340.

The memory 340 comprises random access memory (RAM) locations addressable by the system controller 330 for storing, e.g., data structures and software programs. Interface logic 360 is coupled to the backplane 220, and is configured to transfer data between the backplane 220 and the processor 320.

The memory 340 is a computer readable medium comprising Dynamic Random Access Memory (DRAM) devices configured to implement a 128 Megabyte (Mb) random-access memory. Memory 340 contains various software and data structures used by processor 320 including forwarding database 344 and operating system 342. Database 344 contains conventional forwarding information, such as L2 and L3 addresses of nodes in the network and interface identifiers (IDs) that identify an interface through which a node associated with the address may be reached. Operating system 342 contains computer executable instructions that functionally organize the intermediate node 200 by, e.g., invoking network operations in support of software processes executing on the supervisor engine 300. These processes may include software functions that implement various routing and switching protocols supported by the intermediate node 200, as well as processes that implement aspects of the inventive technique. One skilled in the art would know that other computer readable mediums, such as disk storage devices and flash memory devices, may be used to store computer executable instructions that implement aspects of the present invention.

System controller 330 is coupled to the processor 320 and memory 340, and comprises circuitry configured to enable processor 320 to access (e.g., read, write) memory locations contained in memory 340. Processor 320 is a conventional routing processor configured to execute instructions contained in memory 340 for, inter alia, maintaining and distributing forwarding database 344. Specifically, processor 320 executes instructions that acquire information about packets processed by the various line cards 400, such as VLAN IDs, ports, and L2 and L3 addresses associated with the packets and uses this information to maintain forwarding database 344. Moreover, processor 320 executes instructions to distribute its forwarding database 344 to the various line cards 400 that, as will be discussed further below, may process this information to update and maintain their versions of forwarding databases.

Figure 4:
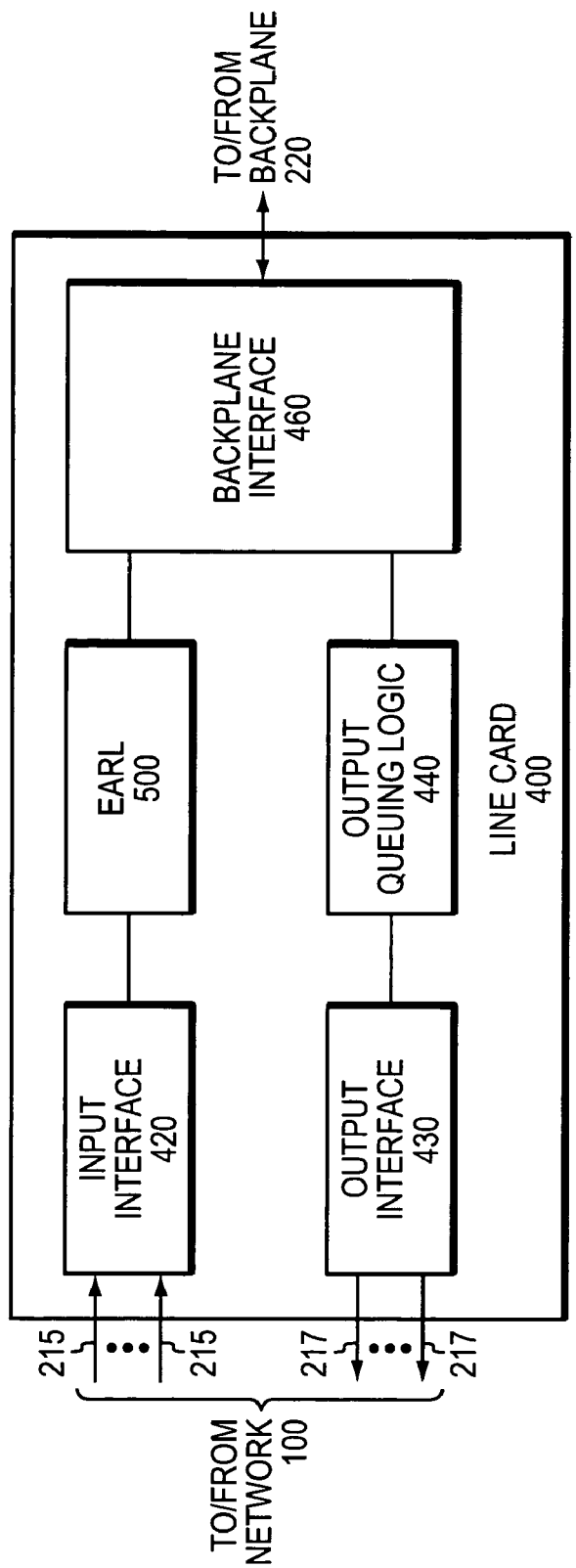
FIG. 4 is a high-level partial schematic block diagram of a line card that may be advantageously used with the present invention.

FIG. 4 is a high-level partial schematic block diagram of a line card 400 that may be advantageously used with the present invention. Line card 400 comprises input interface logic 420, an encoded address recognition logic (EARL) device 500, backplane interface logic 460, output queuing logic 440 and output interface logic 430. Each line card may contain a plurality of input 215 and output 217 ports (interfaces) coupled to the network 100. The input interface logic 420 and output interface logic 430 interface the line card to the network 100 via the input 215 and output 217 ports, respectively, and enable the line card 400 to transfer and acquire data to and from the network 100. To that end, logic 420 and 430 comprise conventional interface circuitry that may incorporate the signal, electrical and mechanical characteristics, and interchange circuits, needed to interface line card 400 with the network's physical media and protocols running over that media.

The backplane interface logic 460 contains interface circuitry that interfaces the line card to the backplane 220 and enables the line card 400 to transfer and acquire data to and from other cards coupled to the backplane 220. The output queuing logic 440 contains circuitry, such as output queues and scheduling control logic, configured to control the transfer of data packets onto the network 100 via the output interface logic 430.

The EARL device 500 is illustratively embodied in an application-specific integrated circuit (ASIC) that comprises circuitry configured to acquire and process data packets including making forwarding decisions for the packets without the aid of the supervisor engine 300. Thus, the line card 400 may continue to forward data packets even though the supervisor engine 300 is not available.

Figure 5:
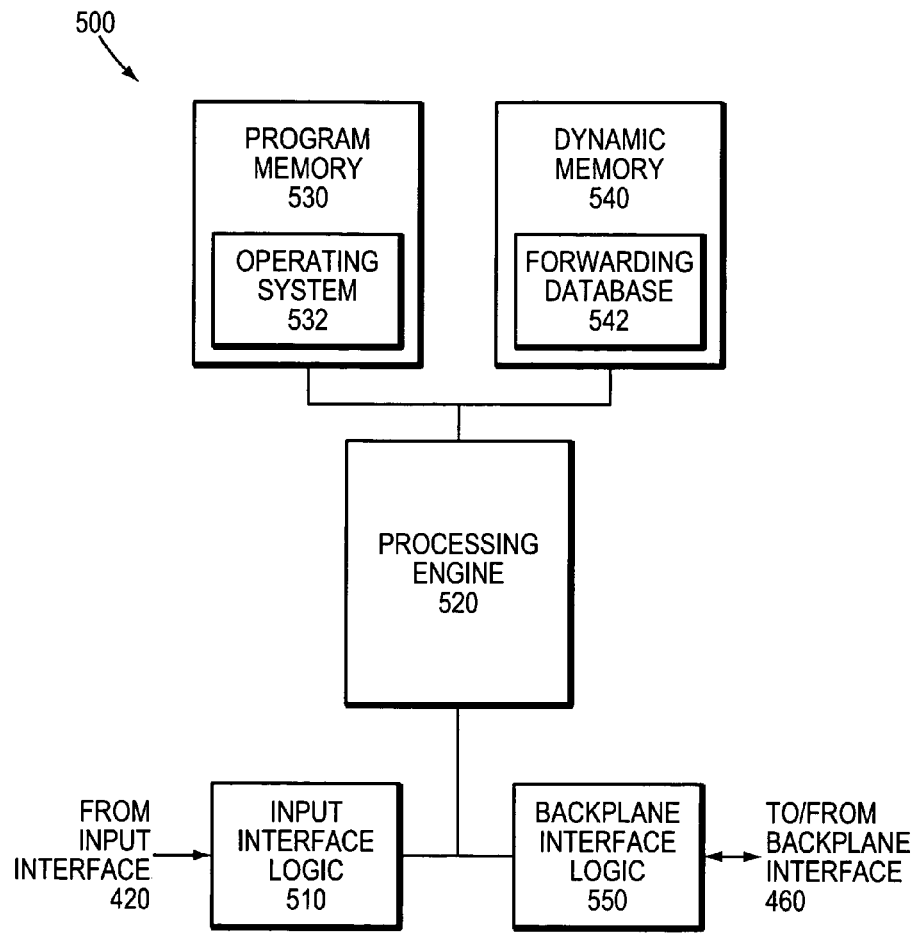
FIG. 5 is a high-level partial schematic block diagram of an Encoded Address Recognition Logic (EARL) device that may be advantageously used with the present invention.

FIG. 5 is a high-level partial schematic block diagram of an EARL device 500 that may be advantageously used with the present invention. EARL 500 comprises input interface logic 510, backplane interface logic 550, a program memory 530 and a dynamic memory 540 all coupled to a processing engine 520. The input interface logic 510 contains circuitry configured to acquire data packets from the input interface 420 and enable the processing engine 520 to access the packets. Likewise, the backplane interface logic 550 contains circuitry that enables the processing engine 520 to direct the transfer of acquired packets to the backplane interface 460. In addition, the input interface logic 510 and backplane interface logic 550 may contain buffers accessible to engine 520 that are configured to hold the acquired packets.

The processing engine 520 is a conventional processor containing various logic, such as arithmetic logic units (ALUs) and execution units (EUs), configured to execute computer executable instructions and manipulate data contained in the program memory 530 and dynamic memory 540. In addition, engine 520 contains logic configured to access packets acquired by the input interface logic 510 from the input interface 420 and direct the transfer of packets to the backplane interface 460 via the backplane interface logic 550.

The program memory 530 and dynamic memory 540 are, illustratively, conventional computer readable mediums containing random-access memory locations configured to hold data and computer executable instructions accessible to the processing engine 520. Memory 530 contains a multi-tasking operating system 532 that functionally organizes processing engine 520 in a manner that enables engine 520 to perform various conventional operating system functions, such as providing system services, timer services, and scheduling various software processes for execution. Program memory 530 also contains various processes (not shown) that operate under control of the operating system 532 and are configured to forward data packets based on information contained in the forwarding database 542 in an autonomous fashion, i.e., without requiring intervention by e.g., the supervisor engine 300.

Dynamic memory 540 is, likewise, a computer readable medium containing random-access memory locations accessible to the processing engine 520. Memory 540 contains various data structures, such as forwarding database 542, which is illustratively used by engine 520 to process packets. It should be noted that memory 540 may be a content-addressable memory (CAM) implemented using CAM devices accessible to engine 520.

Operationally, packets are acquired from the network 100 by the input interface 420 and transferred to the EARL device 500 where the interface logic 510 buffers the packet and notifies the processing engine 520. The processing engine 520 applies information contained in the packet to the forwarding database 542 to determine a destination for the packet. The processing engine then directs the backplane interface logic 550 to direct the backplane interface 460 to transfer the packet either to the output queuing logic 440 or to another card, e.g., another line card 400, the supervisor module, via the backplane 220. Packets acquired by the output queuing logic 440 are placed on an appropriate output queue (not shown) contained in logic 440 and scheduled for transfer onto the network 100 via the output interface 430.

The present invention relates to a technique for gracefully shutting down network resources, such as nodes, links, interfaces and protocols, contained in a data network in a manner that does not cause undue disruption to the data network. The inventive technique may be used in connectionless networking environments, such as environments that employ IP, connection-oriented networking environments, such as systems that employ the MPLS protocol, and multi-protocol environments, such as an environment that employs IP in conjunction with MPLS and uses one or more routing protocols, such as OSPF and IS-IS.

Connectionless Networking Environments

Connectionless protocols, such as IP, often transfer data via datagram services, which are services that transfer the data (e.g., data packets) hop-by-hop from a source to a destination via one or more intermediate nodes (e.g., routers) in a connectionless manner, i.e., the data do not travel on a predetermined path established by a connection. At each intermediate node, a destination address contained in a data packet is typically examined and applied to a forwarding database to determine if an address contained in an entry in the database matches the destination address. If so, the data packet is transferred to the next hop via an interface associated with the matching entry.

Intermediate nodes typically execute various routing protocols to exchange forwarding database information that enables them to determine a route between a source and destination. The IS-IS and OSPF protocols are two examples of routing protocols that are used to exchange routing information used by the IP protocol. These protocols are described at pages 256-323 of *Interconnections*, by Radia Perlman, 11$^{th}$ printing November 1996, by Addison Wesley Longman, Inc., which are hereby incorporated by reference as though fully set forth herein.

Nodes executing the IS-IS protocol exchange information via link-state advertisement messages called link-state packets (LSPs). In accordance with the IS-IS protocol, an intermediate node floods an LSP to each of its neighboring intermediate nodes (i.e., nodes that are immediately coupled to the intermediate node) which, in turn, flood the LSP to their neighboring nodes, and so on. The LSPs contain information in the form of Type-Length-Value (TLV) objects. These objects contain routing information from which a node may generate a topology (graph) of the network and subsequently a forwarding (routing) database from this topology.

Figure 11:
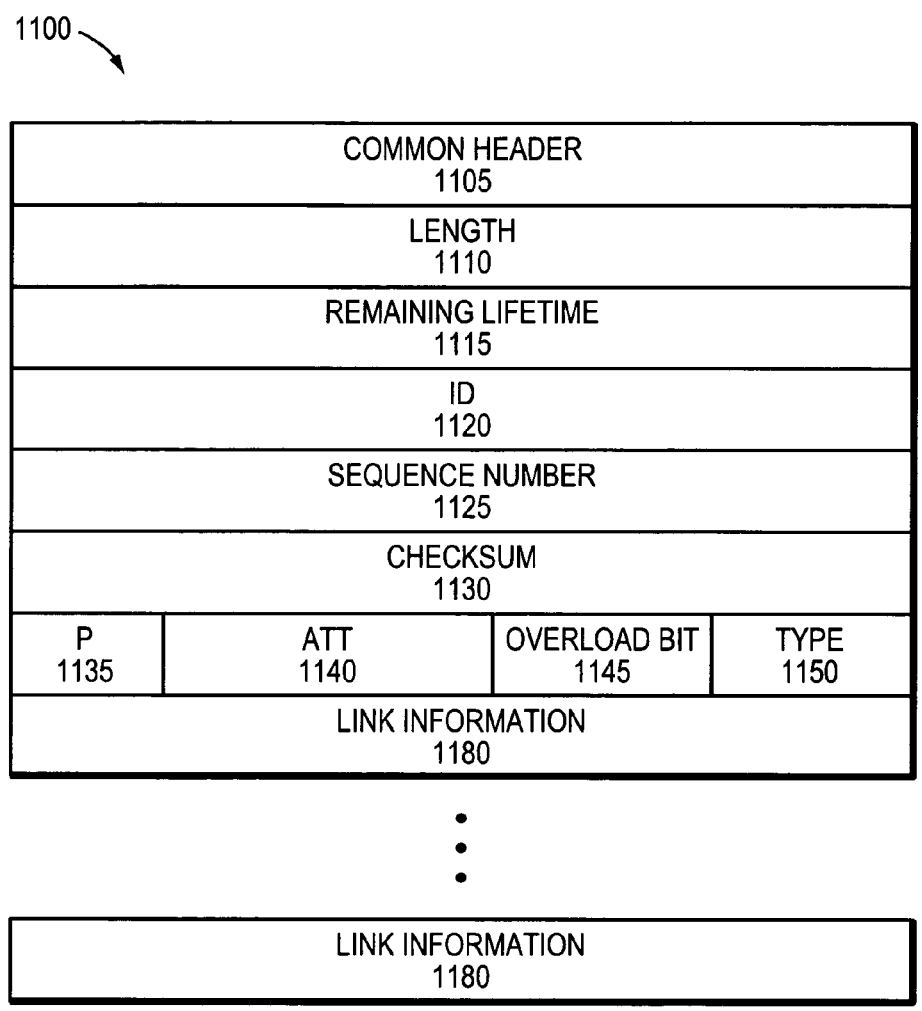
FIG. 11 is a schematic block diagram of an exemplary link state packet message that may be advantageously used with the present invention.

FIG. 11 is a schematic block diagram of an exemplary IS-IS LSP 1100 that may be advantageously used with the present invention. LSP 1100 contains a common header 1105 followed by a length field 1110, a remaining lifetime field 1115, an identifier (ID) field 1120, a sequence number field 1125, a checksum field 1130, a partition repair field (P) 1135, a flag field (ATT) 1140, an overload bit field 1145, a type field 1150 and link information fields 1180.

The common header field 1105 contains various header information associated with the packet that is common to various IS-IS LSPs. The length field 1110 and lifetime field 1115 contain values that indicate a length and the "age" of the LSP, respectively. The ID field 1120 contains a value that identifies the node that generated the LSP 1100. The sequence number field 1125 contains a value that is a sequence number that is associated with the LSP 1100 and the checksum field 1130 contains a value that is a checksum of the LSP from the identifier field 1120 to the end of the LSP. The P field 1135 holds a value that indicates whether the node that generated the LSP supports partition repair and the ATT field 1140 holds flag values associated with various metrics. The overload bit field 1145 holds a value that indicates that the node that generated the LSP is "overloaded" (e.g., has insufficient resources to process the LSPs). The type field 1150 holds a value that indicates the type of node (e.g., level 1 router, level 2 router, etc.). The link information fields 1180 hold link state information associated with the node issuing the LSP including cost and identification of networks directly connected to the node.

Nodes executing the OSPF protocol exchange information using link-state advertisements called LSAs. Like LSPs, LSAs contain information that is used to generate a topology of the network and subsequently a forwarding (routing) database. Also, like the IS-IS protocol, an intermediate node executing the OSPF protocol generates an LSA and floods the LSA to its neighboring nodes, which, in turn, flood the LSA to their neighboring nodes and so on. An intermediate node acquiring an LSA uses the information contained therein to e.g., generate its routing database. As used herein, an "advertisement message" refers generically to a message, such as e.g., a LSP and a LSA, that advertises is link and/or other routing information to nodes in the network.

A LSA typically comprises a LSA header and LSA specific data. FIG. 12 is a schematic block diagram of an exemplary LSA header 1200 that may be advantageously used with the present invention. Header 1200 comprises an age field 1210, options field 1220, type field 1230, link state field 1240, advertising router field 1250, sequence number field 1260, checksum field 1270 and a length field 1280. The age field 1210 holds a value that indicates, inter alia, the time since the LSA was originated. The options field 1220 and the type field 1230 hold values that indicate various options and the type of LSA, respectively. The link state field 1240 holds an identifier (ID) that uniquely identifies the LSA. The advertising router field 1250 holds an ID that identifies the node that originated the LSA. The sequence number field 1260 holds a value that is a sequence number associated with the LSA and the check sum field 1270 holds a value that is a checksum of the contents of the LSA, excluding the age field 1210. The length field 1280 contains a value that indicates a length of the LSA.

In accordance with the inventive technique, for connectionless networking, a resource, such as a node, a link, an interface, or a protocol, is gracefully shut down by i) changing the resource's status to indicate it is being gracefully shut down, ii) advertising the resource's changed status, iii) waiting for a condition associated with the graceful shut down to be met, and iv) if the condition is met, shutting down the resource.

Figure 6:
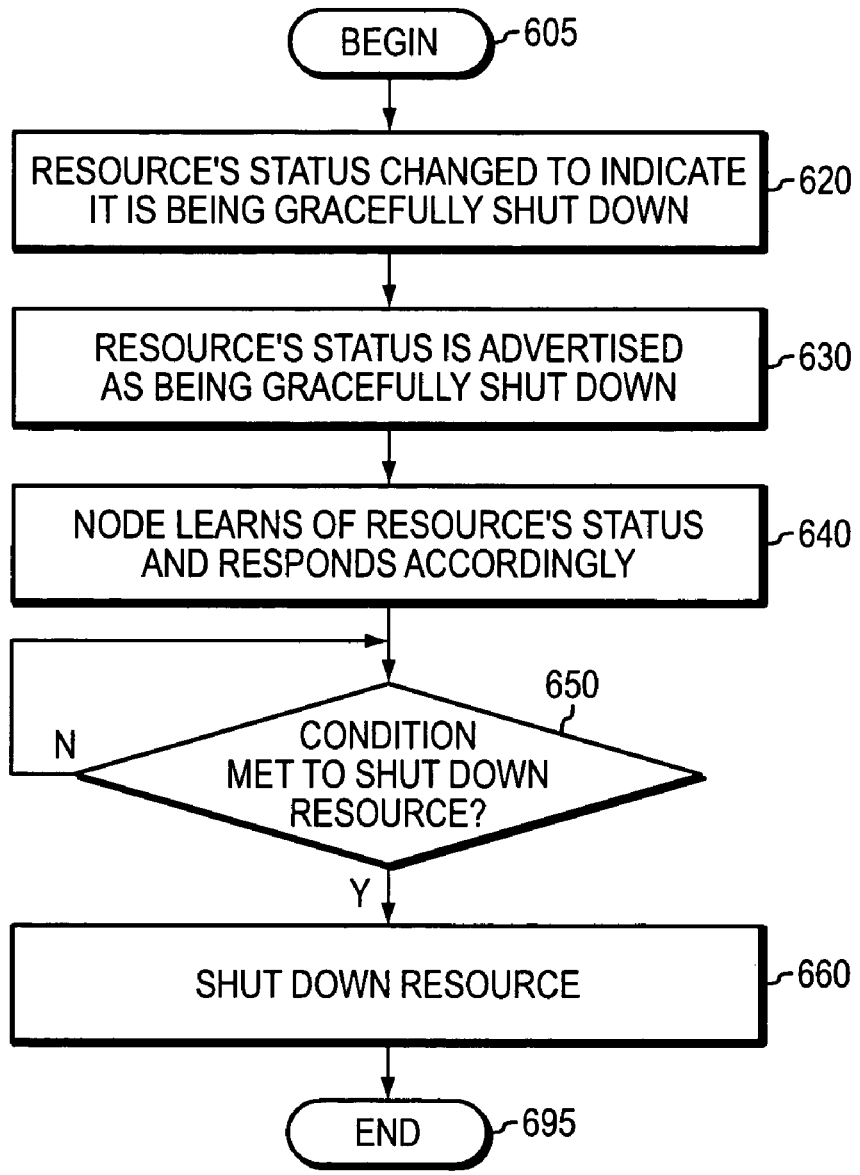
FIG. 6 is a flow chart of a sequence of steps that may be used to gracefully shut down a data network resource associated with a connectionless protocol in accordance with the inventive technique.

FIG. 6 is a flow diagram of a sequence of steps that may be used to shut down a connectionless networking resource on an intermediate node 200 in accordance with the inventive technique. The sequence begins at Step 605 and proceeds to Step 620 where the status of a resource on an intermediate node 200 is changed to indicate the resource is being "gracefully shut down." Illustratively, the resource's status may be changed by an operator manually entering one or more commands into the intermediate node 200 that causes the node 200 to change the resource's status to indicate the resource is being gracefully shut down. Alternatively, the intermediate node 200 may automatically monitor the resource to determine if the resource should be gracefully shutdown, and if so, change the resource's status to indicate the resource is being gracefully shut down.

At Step 630, a node hosting the resource advertises that the resource is being gracefully shut down by generating and issuing an advertisement message that identifies the resource and indicates the resource is being gracefully shut down. Illustratively, for the IS-IS protocol, if the resource is the control plane of the intermediate node, e.g., supervisor engine 300 (FIG. 3), the entire intermediate node itself, or a protocol on the intermediate node, the intermediate node 200 generates an advertisement 1100 containing an overload bit 1145 that is asserted (e.g., set to one) to indicate an overload condition. The intermediate node 200 then floods the advertisement message to its neighboring nodes. If the resource being gracefully shutdown includes one or more links, the intermediate node generates an advertisement that omits information about the links being gracefully shutdown and floods the advertisement message to its neighboring nodes.

For the OSPF protocol, if the resource is the control plane of a node, the node itself, or a protocol executing on the node, an advertisement (e.g., LSA) whose age field 1210 contains a value set to a "maximum age" is generated by the node and flooded to its neighboring nodes. If one or more previously advertised links are being gracefully shut down, an advertisement that omits the previously advertised links that are being gracefully shut down is generated and flooded to the neighboring nodes. Alternatively, if it is desired that the resource accept locally terminated traffic while disallowing/discouraging transit traffic, a "max metric" technique may be used. According to this technique, an advertisement message is generated that associates the resource with a maximum cost. The generated message is then flooded to the intermediate node's neighboring nodes.

An example of a max metric technique that may be used is described in Request for comments (RFC) 3137 titled "OSPF Stub Router Advertisement" by A. Retana, et al., available from the Internet Engineering Task Force (IETF), http://www.ietf.org, and which is hereby incorporated by reference in its entirety as though fully set forth herein. According to this technique, a node, such as node 200, announces to its neighboring nodes in a router-LSA that contains 1) the costs of all non-stub links (i.e., links of the types other than 3) are set to "LSInfinity" (i.e., a value that indicates an infinite cost, such as a 16-bit value 0xFFFF) and 2) the costs of stub links (i.e., type 3) are set to an interface output cost associated with the stub links.

At Step 640 (FIG. 6), other intermediate nodes in the network learn that the resource's status has changed and respond accordingly by acquiring the advertisements and responding to information contained in the advertisements. This response may include regenerating their routing databases. For example, a node executing the IS-IS protocol that acquires an advertisement indicating the issuing node is "overloaded" (i.e., the overload bit is set in the advertisement) regenerates its routing database in a manner that excludes the overloaded node from the database. In addition, if the advertisement does not advertise links that were previously advertised, the node regenerates its forwarding database to exclude the non-advertised links.

Likewise, for example, a node executing the OSPF protocol that acquires an advertisement with the age set to maximum (max age) updates its topology database by purging the node that issued the advertisement from the topology database and regenerates its forwarding (routing) database from the updated topology database. In addition, a node receiving an advertisement that does not advertise links that were previously advertised regenerates its forwarding database to exclude the non-advertised links.

Additionally, if the advertisement "indicates" that the node 200 is entering a "headless" operation mode (e.g., the only resource advertised as being gracefully shut down is the supervisor engine 300), the node acquiring the advertisement may respond by continuing to forward traffic (data packets) to the node and not regenerate its database. For example, since the line cards 400 can continue to forward traffic without assistance from the supervisor engine, a node acquiring the advertisement can rely to an extent on the forwarding capabilities of the line cards 400 and thus continue to forward certain traffic to the node 200 operating in a "headless" operation mode. Illustratively, if the node 200 persists in the "headless" operation mode beyond a predetermined period of time, neighboring nodes may purge the node 200 from their routing databases and regenerate the databases, accordingly. The predetermined period of time may be configurable on the neighboring nodes or advertised by e.g., the node 200 operating in the "headless" operation mode.

At Step 650, the intermediate node 200 hosting the resource determines if a condition associated with the resource being gracefully shut down is met. Illustratively, this condition may include an expiration of a predetermined amount of time and/or a determination that the resource has reached a certain predetermined level of activity, such as a predetermined level of utilization of the resource. If the condition has not been met, the sequence returns to Step 650.

For example, assume a heavily-used link on a node is being gracefully shut down and the condition associated with the graceful shut down is either the expiration of a pre-determined time period or the utilization of the link has been reduced to 10 percent, whichever comes first. The intermediate node 200 monitors the utilization of the link and if the link's utilization reaches 10 percent before the time period expires, the intermediate node concludes the condition has been met. Likewise, if the time period expires before the link's utilization is reduced to 10 percent, the node concludes the condition has been met.

At Step 650, if the condition has been met, the sequence proceeds to Step 660 where the resource is shut down. The sequence ends at Step 695.

Connection-Oriented Networking Environments

The inventive technique may be implemented in a data network that employs connection-oriented protocols or services, such as the MPLS protocol. In a typical connection-oriented networking arrangement, a resource is gracefully shutdown by i) notifying the head-end of each connection established through the resource that the resource is being gracefully shutdown, ii) establishing alternative connections for connections that utilize the resource, iii) switching traffic over to the alternative connections, iv) tearing down the original connections and v) shutting down resource.

For MPLS, head-ends of connections that are established through a resource being gracefully shut down may be notified that the resource is being shut down via an advertisement message containing a graceful shutdown TLV that indicates graceful shutdown of the resource. The advertisement message is generated by the node hosting the resource and flooded to its neighboring nodes.

Figure 7:
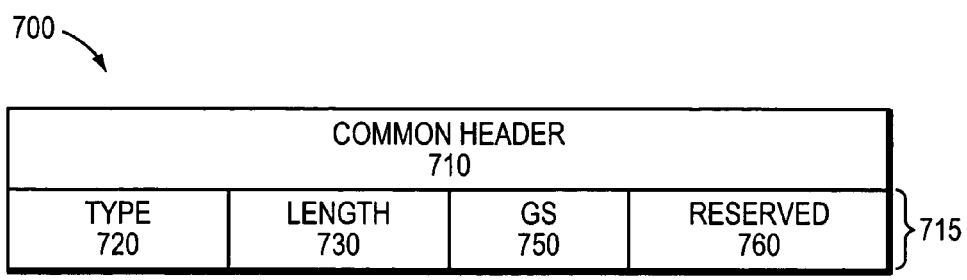
FIG. 7 is a schematic block diagram of an advertisement message containing a Type-Length-Value (TLV) object configured in accordance with the inventive technique that may be advantageously used with the present invention.

FIG. 7 is a schematic block diagram of an advertisement message 700 containing a graceful shutdown TLV field 715 that may be advantageously used with the present invention. Advertisement message 700 comprises a common header field 710, and a graceful shutdown field TLV 715. The common header field 710 contains conventional advertisement header information, which may include an identifier that identifies the node that issued the message and a link-state header that includes an age value that indicates an age associated with the advertisement message. The graceful shutdown TLV field 715 comprises a type field 720, a length field 730, a graceful shutdown (GS) flag field 740, and a reserved field 760. The type field 720 holds a value that, illustratively, indicates the TLV field 715 is a graceful shutdown type TLV field. The length field 730 holds a value that represents the length of TLV field 715. The GS flag 750 is illustratively a one-bit field that if set to a one indicates a "graceful shutdown" of e.g., a node or a link. The reserved field 760 is illustratively a seven-bit field that holds a value that is undefined. The TLV field 715 may be used to advertise e.g., a node-level or a link-level graceful shutdown condition. For example, for OSPF the TLV field 715 may be part of a sub-TLV of an existing TLV of a Traffic Engineering LSA. Traffic Engineering LSA's are described in RFC 3630 titled "Traffic Engineering (TE) Extensions to OSPF Version 2" by D. Katz et al., which is available from the IETF and which is hereby incorporated by reference as though fully set forth herein.

Some connection-oriented protocols and services utilize a separate signaling protocol, such as the resource reservation protocol (RSVP), to provide signaling services that are used to establish a connection. RSVP is described in RFC 2205 titled "Resource Reservation Protocol (RSVP)—Version 1, Functional Specification," by Braden, et al. which is available from the IETF and which is hereby incorporated by reference as though fully set forth herein. Some signaling protocols provide a mechanism for reporting errors if e.g., a problem is encountered with the connection.

For example, the RSVP protocol provides an error specification (ErrorSpec) object that may be used in a path error (PathErr) message to report error conditions detected is in a path from a sender to a destination. The ErrorSpec object in the message specifies, inter alia, information about the error and an IP address of the device where the error occurred. The PathErr message is forwarded to the sender of a Path message (head-end node) to inform the sender of the error. The PathErr message travels upstream towards the sender but does not cause any change in state of the path in any of the intermediate devices traversed on its way to the sender. The message eventually reaches the sender, which may process the message and discontinue sending messages down the path that encountered the error.

Figure 8:
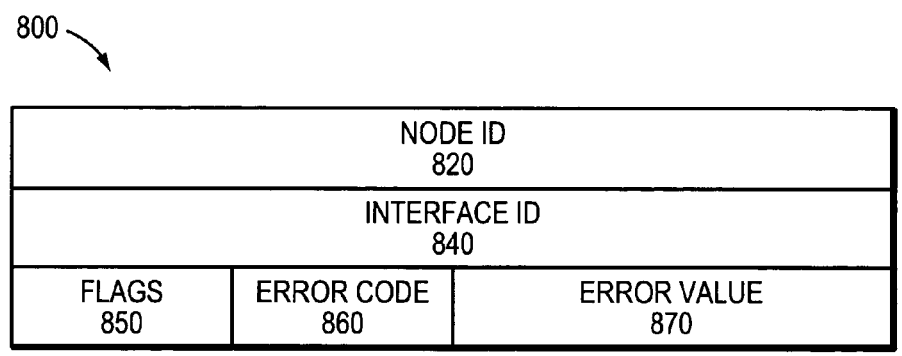
FIG. 8 is a schematic block diagram of an error specification object that may be advantageously used with the present invention.

FIG. 8 is a schematic block diagram of an ErrorSpec object 800 that may be advantageously used with the present invention. Object 800 contains a node identifier (ID) field 820, an interface ID field 840, a flags field 850, an error code field 860 and an error value field 870. The node ID field 820 contains an identifier that identifies the node that detected the error condition, such as e.g., an IP address associated with the node. The interface ID field 840 contains an identifier that identifies an interface on the node that encountered the error.

The flags field 850, error code field 860 and error value field 870 indicate information associated with the error. Specifically, the error code field 860 contains a code that indicates the type of error. In accordance with the inventive technique, the error code field 860 may contain error codes that indicate: i) a local maintenance on a link/node is required or ii) local maintenance on a component link is required.

The "local maintenance on a link/node is required" error code indicates that a node, identified by the node ID field 820, or a link on a node, identified by the combination of the node ID field 820 and interface ID field 840, is being gracefully shut down. A head-end node that acquires a message containing an ErrorSpec object specifying this error code responds by performing a "make-before-break" operation. Specifically, the head-end node i) establishes an alternative connection to the tail-end node that does not utilize the node/link identified in the ErrorSpec object, ii) breaks the connection through the identified node/link and iii) transfers successive data over the alternative connection.

The "local maintenance on a component link required" error code indicates that a component link identified by the combination node ID field 820 and interface ID field 840 that is contained within a "bundled" link is being gracefully shut down. Bundled links are described in "Link Bundling in MPLS Traffic Engineering," by K. Kompella et al., draft-ietf-mpls-bundle-04.txt which is available from the IETF and which is hereby incorporated by reference as though fully set forth herein. In response to acquiring a message containing this error code, the immediate upstream node marks the component link as being gracefully shutdown and blocks it from being selected for future connections. A head-end node that acquires the message responds by performing a "make-before-break" operation, as described above, to establish an alternative connection that does not use the component link. The alternative connection may make use of another component link within the same bundled link carrying the identified link provided there is capacity within the bundled link.

In accordance with the inventive technique, a resource that is associated with one or more connections is gracefully shut down in a "make-before-break" fashion. That is, for each "original" connection through the resource, an alternative connection is established and traffic is switched to the alternative connection before the original connection is torn down.

Figure 9:
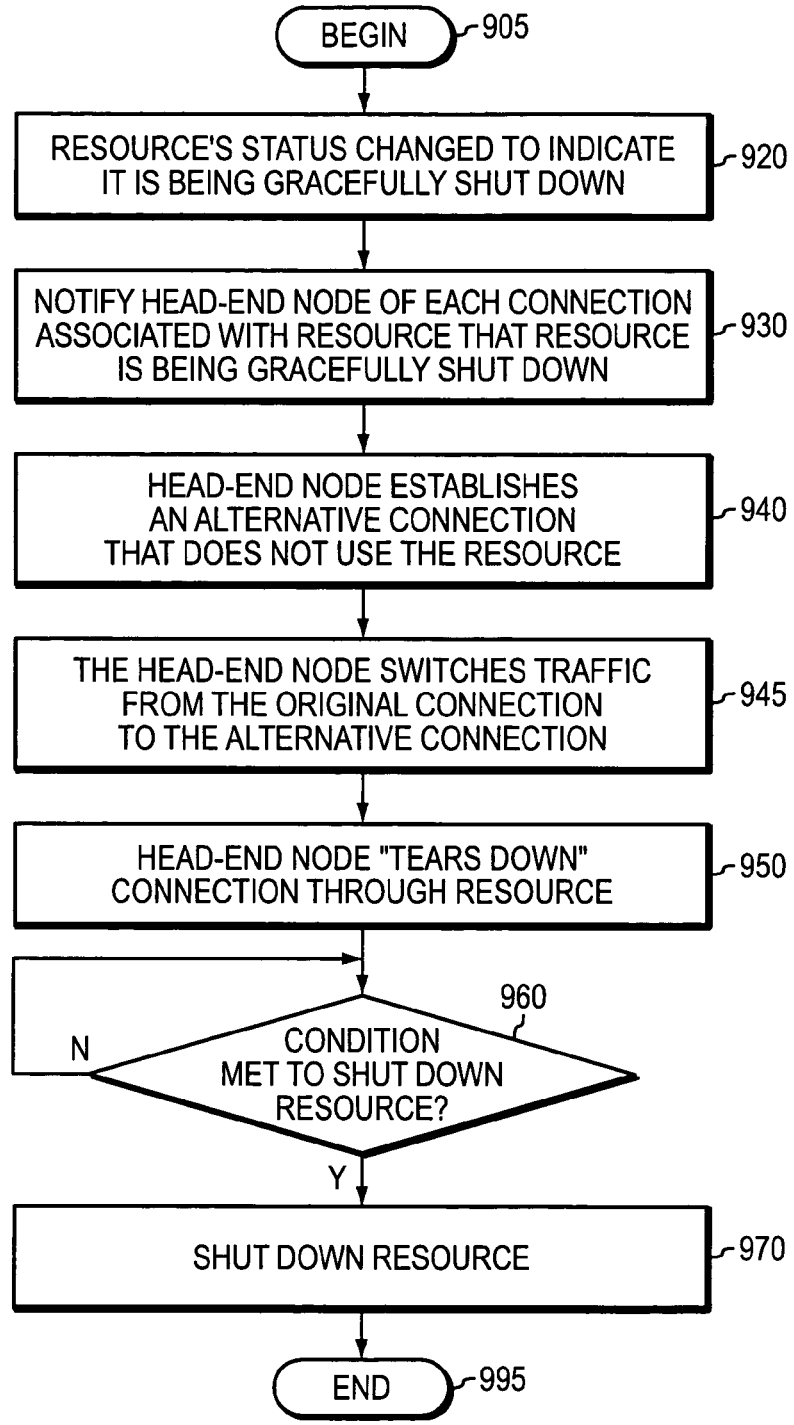
FIG. 9 is a flow chart of a sequence of steps that may be used to gracefully shut down a data network resource associated with a connection-oriented protocol in accordance with the inventive technique.

FIG. 9 is a flow chart illustrating a sequence of steps that may be used to gracefully shut down a resource associated with one or more connections in accordance with the inventive technique. The sequence begins at Step 905 and proceeds to Step 920 where resource's status is changed to indicate it is being gracefully shut down, in a manner as described above. At Step 930, the node hosting the resource issues a notification to the head-end node of each connection that utilizes the resource that the resource is being gracefully shut down. This notification may be, e.g., a PathError message 800 or an advertisement message 700 containing information that indicates a resource is being shutdown and identifies the resource being shut down, as described above.

Further, if the resource (e.g., a link) is associated with a "switching capability" that is Lambda-Switch Capable (LSC) or Fiber-Switch Capable (FSC), the resource may be advertised as having a "max labeled-switched path bandwidth" of zero. Advertising a max labeled-switched path bandwidth for a resource and associating a resource with a switching capability is described in "IS-IS Extensions in Support of Generalized MPLS" by K. Kompella et al., draft-ietf-isis-gmpls-extensions-16.txt, available from the IETF and which is hereby incorporated by reference in its entirety as though fully set forth herein.

At Step 940, the head-end node of each connection affected by the shut down of the resource acquires the notification and establishes an alternative connection that does not utilize the resource to the tail-end node. In addition, the node containing the resource being gracefully shut down rejects requests to establish new connections using the resource in the form of e.g., a PathErr message containing an appropriate cause code that is transferred to the head-end node attempting to establish the connection. This ensures that new connections are not established through the resource while the resource is being gracefully shut down.

At Step 945, the head-end node switches traffic from the original connection, i.e., the connection using the failed resource, to the newly established alternative connection. At Step 950, after moving traffic to the newly established alternative connection to the tail-end node, the head-end node "tears down" (removes) the original connection. At Step 960 the node hosting the resource determines if a condition has been met that warrants shutting down the resource. Illustratively, this condition may be the expiration of a predetermined period of time, the resource reaching a certain level of activity (utilization), as described above and/or a signal that indicates the connection is being torn down from the head-end node associated with the connection. If the condition is not met, the sequence returns to Step 960. If the condition is met, the sequence proceeds to Step 970 and the resource is shut down. The sequence ends at Step 995. Note that, the node hosting the resource that has been gracefully shut down responds to connections that are still using the resource with a PathErr message containing an appropriate cause code that indicates the resource has been shut down.

Multi-Protocol Environments

In some circumstances, when a resource such as an entire node or interface is gracefully shut down, more than one protocol active on that resource may need to be gracefully shut down before the resource is shut down. Moreover, if there is an established hierarchy between the protocols, the protocols may need to be gracefully shut down in a specific order. For example, often when a connection-oriented protocol and a connectionless protocol are active on a resource, the connection-oriented protocol is shut down before the connectionless protocol. Shutting down the connection-oriented protocol typically involves establishing alternative connections that do not use the resource then removing the connections through the resource, as described above. Likewise, shutting down the connectionless protocol through the resource may involve advertising the resource as being gracefully shut down, in a manner as described above.

Figure 10:
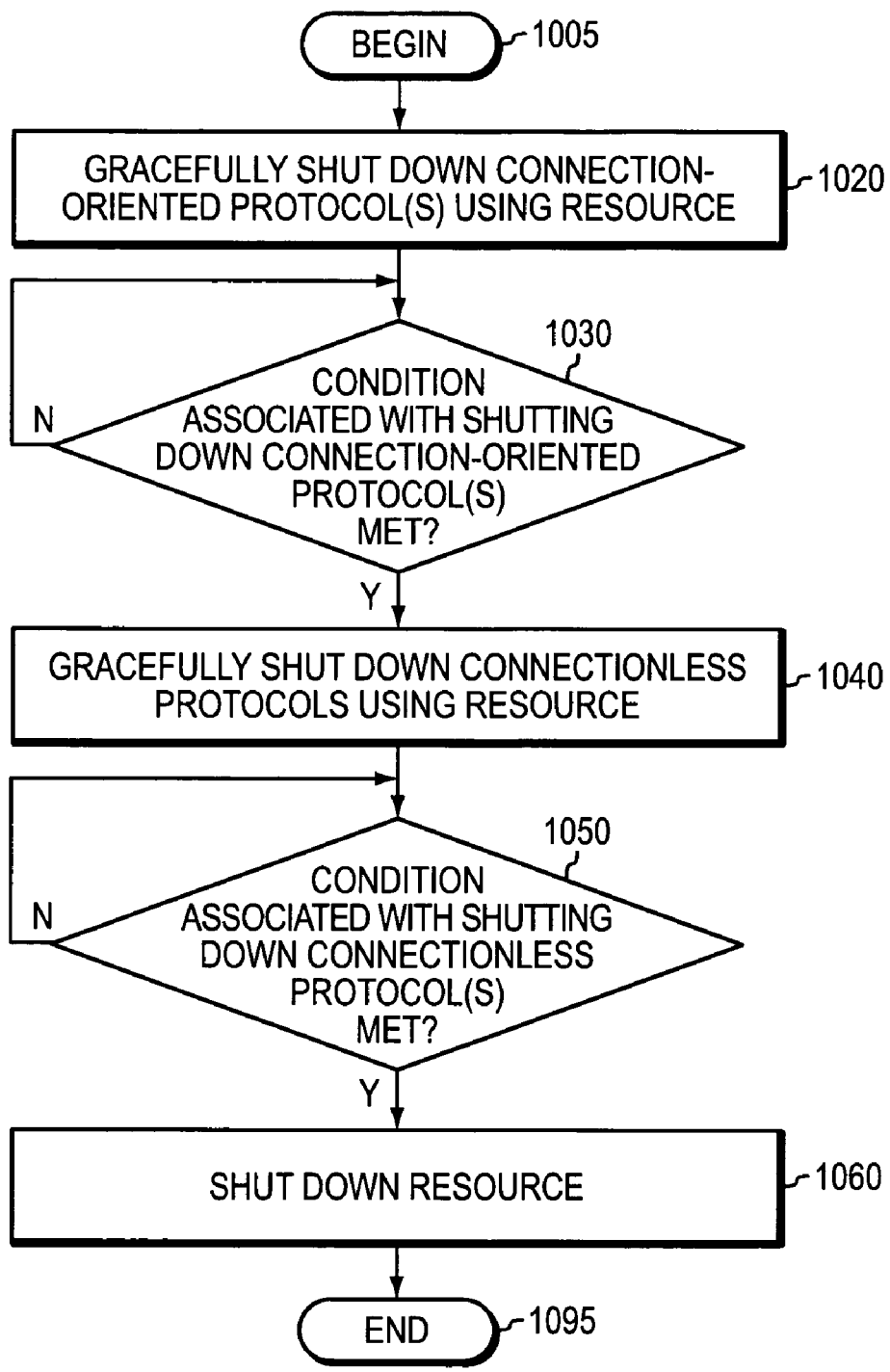
FIG. 10 is a flow chart of a sequence of steps that may be used to gracefully shut down a data network resource associated with a connection-oriented protocol and a connectionless protocol in accordance with the inventive technique.

FIG. 10 is a flow chart of a sequence of steps that may be used to gracefully shut down a resource that is associated with a connection-oriented protocol and a connectionless protocol. The sequence begins at Step 1005 and proceeds to Step 1020 where traffic for connections that utilize the resource is moved to alternative connections and the connections are shut down in a manner as described above. Next, at Step 1030, a check is performed to determine if a condition associated with shutting down the connection-oriented protocols has been met. Illustratively, this condition may include the expiration of a predetermined period of time (e.g., a grace period) that allows time for the traffic to be transferred from the original connections to the alternative connections and/or the resource has reached a predetermined level of activity.

At Step 1040, the connectionless protocols utilizing the resource are shut down gracefully in a manner as described above and at Step 1050 a check is performed to determine if a condition associated with shutting down the connectionless protocols has been met. As noted above, this condition may include e.g., the expiration of a predetermined period of time in order to allow other nodes in the network to respond to the connectionless protocols being shut down, the resource reaching a predetermined level of activity and/or a signal that indicates the connection is being torn down from a head-end node associated with a connection that is associated with a connectionless protocol being shut down.

At Step 1060, the resource is shut down and at Step 1095 the sequence ends.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In a computer network comprising a plurality of intermediate nodes, a method for gracefully shutting down a resource contained in an intermediate node, the method comprising the steps of:
   advertising to other intermediate nodes in the network that a resource is being gracefully shut down;
   determining if a condition that warrants shutting down the resource is met, wherein the condition is an expiration of a predetermined period of time; and
   if the condition is met, shutting down the resource.

2. A method as defined in claim 1 wherein the resource is a protocol.

3. A method as defined in claim 1 wherein the resource is an interface.

4. A method as defined in claim 1 wherein the resource is a node.

5. A method as defined in claim 1 comprising the steps of:
   entering one or more commands into the intermediate node to indicate the resource is being gracefully shutdown; and
   advertising the resource is being gracefully shut down.

6. A method as defined in claim 1 comprising the steps of:
   monitoring the resource to determine if the resource should be gracefully shut down; and
   if so, advertising the resource is being gracefully shut down.

7. A method as defined in claim 1 wherein the intermediate node is coupled to one or more neighboring intermediate nodes in the plurality of intermediate nodes.

8. A method as defined in claim 7 comprising the steps of:
   generating an advertisement message containing an overload bit that is asserted; and
   flooding the advertisement message to the neighboring intermediate nodes.

9. A method as defined in claim 7 comprising the steps of:
   generating an advertisement message containing an age value set to a maximum age; and
   flooding the advertisement message to the neighboring intermediate nodes.

10. A method as defined in claim 7 comprising the steps of:
    generating an advertisement message that associates the resource with a maximum cost; and
    flooding the advertisement message to the neighboring intermediate nodes.

11. A method as defined in claim 7 comprising the steps of:
    generating an advertisement message containing costs associated with non-stub links set to LSInfinity and costs associated with stub links set to an interface output cost; and
    flooding the advertisement message to the neighboring intermediate nodes.

12. A method as defined in claim 7 comprising the steps of:
    advertising the resource to the neighboring intermediate nodes;
    generating an advertisement message that omits the resource; and
    flooding the advertisement message to the neighboring intermediate nodes.

13. A method as defined in claim 7 comprising the steps of:
    generating an advertisement message containing a graceful shutdown type-length-value field; and
    flooding the advertisement message to the neighboring intermediate nodes.

14. A method as defined in claim 13 wherein the advertisement message contains information that identifies the resource being gracefully shut down.

15. In a computer network comprising a plurality of intermediate nodes, a method for gracefully shutting down a resource contained in an intermediate node, the method comprising the steps of:
    advertising to other intermediate nodes in the network that a resource is being gracefully shut down;
    determining if a condition that warrants shutting down the resource is met, wherein the condition is the resource reaching a predetermined level of activity; and
    if the condition is met, shutting down the resource.

16. An intermediate node contained in a data network comprising a plurality of intermediate nodes, the intermediate node comprising:
    a resource; and
    a processor configured to:
    a) advertise to other intermediate nodes in the network that the resource is being gracefully shut down,
    b) determine if a condition that warrants shutting down the resource is met, wherein the condition is an expiration of a predetermined period of time; and
    c) if the condition is met, shutting down the resource.

17. An intermediate node as defined in claim 16 wherein the resource is a protocol.

18. An intermediate node as defined in claim 16 wherein the resource is an interface.

19. An intermediate node as defined in claim 16 wherein the resource is a node.

20. An intermediate node as defined in claim 16 wherein the processor is configured to monitor the resource to determine if the resource warrants being gracefully shut down and if so, advertise the resource is being gracefully shut down.

21. An intermediate node as defined in claim 16 wherein the processor is configured to advertise the resource is being gracefully shut down in response to one or more commands entered into the intermediate node.

22. An intermediate node as defined in claim 16 wherein the intermediate node is coupled to one or more neighboring intermediate nodes contained in the plurality of intermediate nodes.

23. An intermediate node as defined in claim 22 wherein the processor is configured to generate an advertisement message containing an overload bit that is asserted and flood the advertisement message to the neighboring intermediate nodes.

24. An intermediate node as defined in claim 22 wherein the processor is configured to generate an advertisement message containing an age value set to a maximum age and flood the advertisement message to the neighboring intermediate nodes.

25. An intermediate node as defined in claim 22 wherein the processor is configured to generate an advertisement message that associates the resource with a maximum cost and flood the advertisement message to the neighboring intermediate nodes.

26. An intermediate node as defined in claim 22 wherein the processor is configured to generate an advertisement message containing costs associated with non-stub links set to LSInfinity and costs associated with stub links set to interface output cost and flood the advertisement message to the neighboring intermediate nodes.

27. An intermediate node as defined in claim 22 wherein the processor is configured to generate an advertisement message that omits the resource that is being gracefully shut down and flood the advertisement message to the neighboring intermediate nodes.

28. An intermediate node as defined in claim 22 wherein the processor is configured to generate an advertisement message containing a graceful shutdown type-length-value field and flood the advertisement message to the neighboring intermediate nodes.

29. An intermediate node as defined in claim 28 wherein the advertisement message contains resource information that identifies the resource being gracefully shut down.

30. An intermediate node contained in a data network comprising a plurality of intermediate nodes, the intermediate node comprising:
   a resource;
   means for advertising the resource is being gracefully shut down to other intermediate nodes in the network;
   means for determining if a condition warranting the graceful shutdown of the resource is met, wherein the condition is an expiration of a predetermined period of time; and
   means for shutting down the resource if the condition is met.

31. A computer readable medium comprising computer executable instructions for execution in a processor for:
   advertising a resource contained in an intermediate node is being gracefully shut down to other intermediate nodes in a network;
   determining if a condition that warrants shutting down the resource is met, wherein the condition is the expiration of a predetermined period of time; and
   if the condition is met, shutting down the resource.

32. A computer readable medium comprising computer executable instructions for execution in a processor for:
   advertising a resource contained in an intermediate node is being gracefully shut down to other intermediate nodes in a network;
   determining if a condition that warrants shutting down the resource is met, wherein the condition is the resource reaching a predetermined level of activity; and
   if the condition is met, shutting down the resource.

33. In a computer network comprising a plurality of intermediate nodes, a method for gracefully shutting down a resource contained in an intermediate node wherein the resource is associated with one or more connections, the method comprising the steps of:
   notifying a head-end node of each connection associated with the resource that the resource is being gracefully shut down;
   determining if a condition associated with the graceful shutdown of the resource is met, wherein the condition is the expiration of a predetermined period of time; and
   if the condition is met, shutting down the resource.

34. In a computer network comprising a plurality of intermediate nodes, a method for gracefully shutting down a resource contained in an intermediate node wherein the resource is associated with one or more connections, the method comprising the steps of:
   notifying a head-end node of each connection associated with the resource that the resource is being gracefully shut down;
   determining if a condition associated with the graceful shutdown of the resource met, wherein the condition is the resource reaching a predetermined level of activity; and
   if the condition is met, shutting down the resource.

35. A method as defined in claim 34 comprising the steps of:
   for each connection:
   a) establishing an alternative connection;
   b) switching traffic from the connection to the alternative connection; and
   c) tearing down the connection.

36. A method as defined claim 34 wherein the condition further includes a head-end node associated with a connection signaling that the connection is being torn down.

37. In a computer network comprising a plurality of intermediate nodes, a method for gracefully shutting down a resource contained in an intermediate node wherein the resource is associated with one or more connections and one or more connectionless protocols, the method comprising the steps of:
   gracefully shutting down the one or more connections;
   determining if a first condition associated with shutting down the connections is met;
   gracefully shutting down the one or more connectionless protocols;
   determining if a second condition associated with the shutting down the connectionless protocols is met; and
   if the second condition is met, shutting down the resource.

38. A method as defined in claim 37 wherein the first condition is the expiration of a predetermined period of time.

39. A method as defined in claim 37 wherein the first condition is the resource reaching a predetermined level of activity.

40. A method as defined in claim 37 wherein the second condition is an expiration of a predetermined period of time.

41. A method as defined in claim 37 wherein the second condition is the resource reaching a predetermined level of activity.

42. A method as defined in claim 37 wherein the second condition is a signal from a head-end node associated with a connection, that is associated with a connectionless protocol being shut down, indicating that the connection is being torn down.

* * * * *

UNITED STATES PATENT AND TRADEMARK OFFICE
CERTIFICATE OF CORRECTION

| | | |
|---|---|---|
| PATENT NO. | : 7,457,248 B1 | Page 1 of 1 |
| APPLICATION NO. | : 10/775855 | |
| DATED | : November 25, 2008 | |
| INVENTOR(S) | : Zafar Ali | |

It is certified that error appears in the above-identified patent and that said Letters Patent is hereby corrected as shown below:

Col. 9, Line 22, should read

--e.g., a LSP and a LSA, that advertises [[is]] link and/or other--

Col. 12, Line 27, should read

--(PathErr) message to report error conditions detected [[is]] in a--

Col. 18, Line 7, should read

--shutdown of the resource is met, wherein the condition is--

Signed and Sealed this

Thirteenth Day of July, 2010

David J. Kappos
*Director of the United States Patent and Trademark Office*